United States Patent Office 3,300,705
Patented Jan. 24, 1967

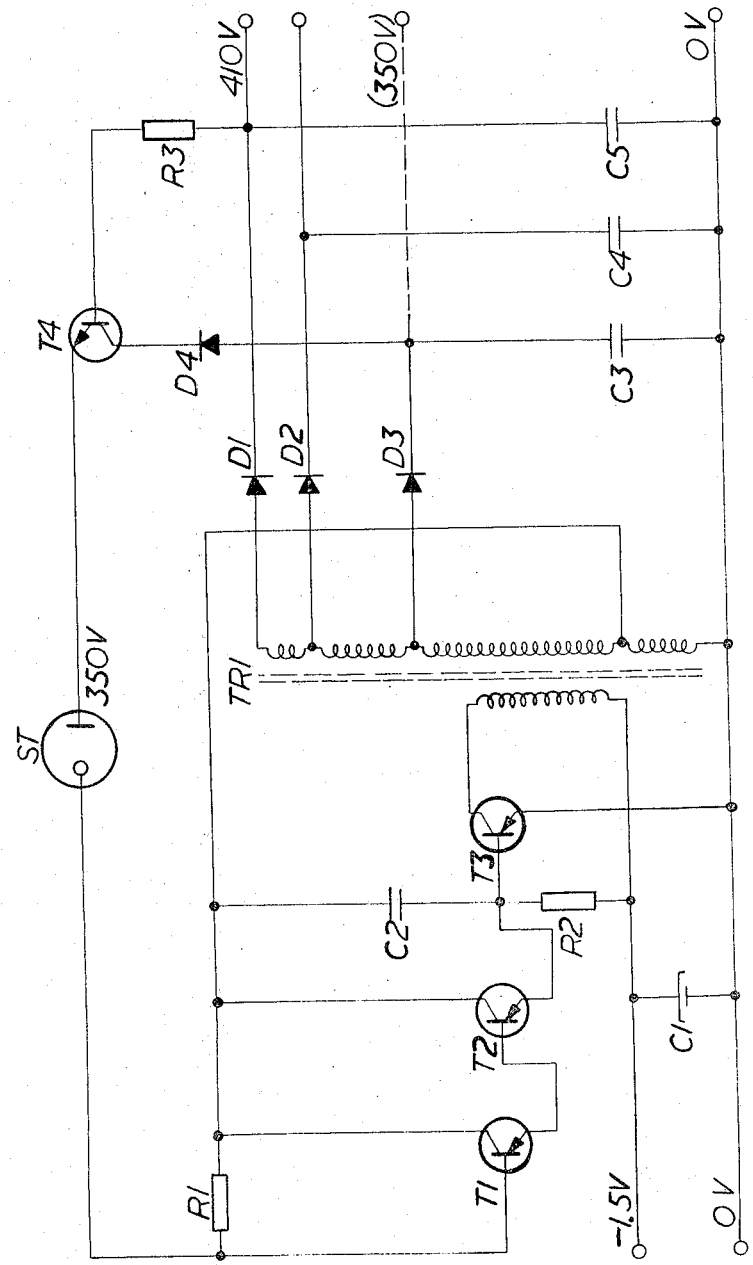

3,300,705
REGULATED D.C. VOLTAGE CONVERTER
Asbjorn Hunstad, Oslo, Norway, assignor to International Standard Electric Corporation, New York, N.Y., a corporation of Delaware
Filed Aug. 28, 1963, Ser. No. 305,165
Claims priority, application Norway, Aug. 30, 1962, 145,560
4 Claims. (Cl. 321—2)

The present invention relates to power supply circuits for portable instruments, such as radiation detectors and the like, and is particularly concerned with improving the output voltage stability of battery-operated power supply circuits despite changes in operating voltage of such batteries or other changes in operating conditions.

When such power supply circuits are used in portable equipment, it is essential that the circuits be energized from portable batteries, such as dry cells, as the portability, compactness and light weight of such equipment are important. In many applications, the requirements for high operating voltage prohibit the use of batteries alone, and it has, therefore, become customary to use dry cell batteries as the primary voltage source to drive a suitable converter which will provide the necessary high operating voltages. For example, one or two dry cells operating at 1.5 volts can be made to provide a voltage of the order of several hundred volts to a low drain load by the use of suitable converter apparatus.

Where a large voltage step-up is needed, it will readily be appreciated that even a very small change in voltage of the primary dry cell source can produce considerable variation in output voltage. It it well known that dry cells during their useful life gradually decline in voltage from an initial terminal voltage of about 1.5 volts to as low as 1.0 volt, which is more than a 30% decline. Any corresponding variation in the magnified output voltage would obviously be completely intolerable. It has accordingly become necessary to assure, in some way, a fairly constant high operating voltage in accordance with the requirements of the equipment in question. One way has been to use only a short portion of the life of the battery during which its voltage declines only slightly, but this is, of course, wasteful use of the batteries and requires frequent change of batteries.

Another way of attempting to accomplish the desired result has been to provide voltage stabilizer tubes and/or circuits in the output of the converter system.

In U.S. Patent No. 2,790,947, the use of a converter of the vibrator type in connection with a voltage stabilizer tube is shown, but mechanical converters are not considered to have the desired reliability.

U.S. Patent No. 2,852,729 shows the use of corona stabilizer tubes as a voltage stabilizing device, but the circuitry suggested is not suitable for light weight portable equipment, since one 90 volt or two 45 volt batteries are required.

It is, therefore, an object of the present invention to provide a pocket-sized power supply for GM-tubes and the like.

A further object is to provide a power supply operable from a single 1.5 volt dry cell and having a low current drain to permit long battery life, i.e. more than 100 hours continuous operation, under full load, or more than 250 hours continuous operation when loaded slightly.

A feature of the invention is the utilization of a corona stabilizer tube which is arranged between the controlling transistor(s) and the converter output, and a current limiting circuit inserted between the stabilizer tube and the converter output, to prevent the current through the stabilizer tube from exceeding certain limits and to ensure that the tube is operating also during "off" conditions of the oscillator.

Above-mentioned feature and objects of this invention will be clearly understood from the following detailed description taken in conjunction with the accompanying drawing which shows a preferred embodiment of the D.C. to D.C. converter in accordance with this invention.

The present invention thus relates to a D.C. voltage converter for GM-tubes and comprising a transistor-oscillator, a transformer one or more rectifying and filtering means, and one or more transistors for controlling the transistor-oscillator.

Referring now to the accompanying figure, a single 1.5 volt dry cell is used as voltage source, operating a transistor-oscillator consisting of a transistor T3, the emitter collector circuit of which is connected in series with the primary winding of a transformer TR1. A capacitor C1 is connected across the battery in order to reduce the internal impedance of the battery. The base of transistor T3 is biased from −1.5 volts by a resistor R2 to secure starting of the oscillation after an "off" condition and is connected via a capacitor C2 to a feedback winding on the secondary of transformer TR1. The "on" pulse rate of the oscillator will in principle be constant as long as the converter loading remains constant.

Two output circuits are indicated, each comprising a rectifier and a capacitor, D1–C5 and D2–C4 respectively. A third output, comprising a rectifier D3 and a capacitor C3 is used for the voltage control, and this output may be loaded as well.

In order to control the oscillator transistor with the least possible power consumption a cascade of two transistors T1 and T2 is connected to the base of T3. All transistors T1, T2 and T3 are of the PNP-type. A resistance R1 is arranged to control the feedback current to the base of the transistor T1, and simultaneously to control the feedback to the oscillator transistor T3. The value of R1 should be chosen so low that it provides enough feedback current under the worst operating conditions, i.e. at the lowest actual temperature and at the lowest actual battery voltage. The capacitor C2 is connected to the base of transistor T3 in order to reduce the hole storage effect which would tend to reduce the efficiency of the converter.

A corona stabilizer tube ST, having an operating voltage of 350 volts is also connected to the base of transistor T1. The rating of this tube is obviously chosen depending on the desired output voltage and it should be as large as possible, but a somewhat lower than the largest output voltage should be chosen to obtain favorable regulation.

The transformer tapping for the control voltage (rectifier D3 and capacitor C3) should be chosen to give the same D.C. output voltage as the rating of the tube ST.

A NPN-type transistor T4 is connected between the anode of the corona stabilizer tube ST and the control voltage output by means of diode D4. The base of the transistor T4 is connected via a large resistor R3 to the output of the converter at D1–C5, so that a base current will flow in transistor T4, and also through the resistor R3 and the corona stabilizer tube ST.

The difference in voltage between the outputs D3–C3 and D1–C5 is equal to or greater than the difference between the operating and the ignition voltage for the tube. Because of the diode D4, no current can flow between the output D1–C5 and the control output D3–C3.

The corona stabilizer tube will ignite and be kept operating by the base current in T4. This base current permits a greater collector current to flow from the control output D3–C3 via the diode D4, transistor T4, and tube ST to the base of the control transistor T1, thus controlling the oscillator transistor T3. The collector voltage drop in transistor T4 will be low for currents smaller than a value determined by the base current, but increase rapidly for higher currents. This means that transistor T4 acts as a current limiter with a very low impedance in normal conditions.

The potential on the base of the transistor T1 will follow the potential from the feed-back winding on the transformer, being about —0.9 v. in the "on" condition of the oscillator and about +16 v. in the "off" condition. The potential at the anode of the tube ST will correspondingly be +349.1 v. in the "on" condition of the oscillator and 366 v. in the "off" condition. The control current from the output D3–C3 (voltage 350 v.) will, therefore, flow only in the "on" condition of the oscillator, while in the "off" condition, the low base current (410–366) v./R3 will flow which is just high enough to keep the tube ST burning.

In summary, it should be noted that in order to keep the output voltage constant, the current through the primary winding of TR1 has to be controlled. This is done by controlling the emitter-connector resistance of T1, which is turn is dependent on the base current of T1. The corona tube ST represents the voltage control feedback. It steps down the voltage to a suitable level. Its control current is, however, so low that it has to be amplified in the two cascade connected transistors T1 and T2 before it is fed to the base of T3. Transistor T4 is used as a current limiter for protecting corona tube ST from overload.

The base potential of T1 is a result of voltage dividing between, on one side the base-emitter circuits of T1, T2, and T3, and on the other side the corona tube ST, the anode of which is connected through T4, D4 and R3 to the D.C.-outputs.

The ignition voltage is fed to the corona tube from the 410 volt output through R3 and T4. During the ON-condition the burning voltage is coming from the D3–C3 output through D4–T4. During the off-condition, the burning voltage of the corona tube ST is taken from the 410 volt output through R3 and base-emitter of T4.

If the connection from the emitter of T2 to the base of T3 is broken, the oscillator will operate as a free running blocking oscillator. However, the output voltage of this oscillator can be stabilized and regulated if the correct control current is fed to the base of T3. In the converter this control current is taken from the output side of the transformer, stepped down in the corona tube and fed to the base of T3 through T1 and T2.

During normal operation, the voltage on the base of T1 will be about —0.9 volt. If the output voltage is increasing above the desired value, the feedback through T4 and the corona tube will cause an increase of the base voltage of T1, which in turn will result in the increase of the collector-emitter resistance of T3. Consequently, the current through the primary winding of the transformer will have a lower value in the following on-periods resulting in a drop of the output voltage to the desired value.

The circuit described above will have a voltage regulation which varies less than 0.1% with a battery voltage declining from 1.5 volts to 1.0 volt. The voltage reguation will furthermore not be affected by humidity and the temperature coefficient is about 0.01% per ° C. in a temperature range from —30° C. to +60° C. It should also be noted that the circuit components may be chosen so that the voltage regulation is better than 0.1% up to a desired maximum load.

In one embodiment of the invention the following component values have been used: R1=100K.; R2=100K.; R3=15M; C1=5,000 µf.; C3, C4=0.1 µf.; and C5=0.2 µf.

While I have described above the principles of my invention in connection with specific apparatus, it is to be clearly understood that this description is made only by way of example and not as a limitation to the scope of my invention as set forth in the objects thereof and in the accompanying claims.

I claim:

1. A voltage converter for converting low magnitude D.C. voltage to a high magnitude D.C. voltage comprising a source of D.C. voltage, a transistor oscillator coupled to said source, a transformer having a primary and secondary winding said primary winding being connected to said transistor oscillator, a plurality of output rectifying means coupled to said secondary winding at tapped points therealong, means for applying a feedback current to said transistor oscillator from said secondary winding, voltage stabilization means coupled in parallel with said means for applying a feedback current, and a current limiting transistor, the base-emitter of which is interposed between said stabilization and rectifying means, such that said limiting transistor has a collector coupled to said output rectifying means to provide a voltage corresponding to the operating voltage of said voltage stabilization means and a base circuit coupled to said output rectifying means at a voltage higher than said operating voltage to provide for the flow of base current.

2. A voltage converter according to claim 1 wherein said means for applying a feedback current includes a feedback winding on the secondary of said transformer, a transistorized cascade amplifier connected to said transistor-oscillator, and a current limiting resistor interposed between said cascade amplifier and said feedback winding to provide a control voltage to said cascade amplifier which follows the current variations in said feedback winding.

3. A voltage converter according to claim 1 wherein said voltage stabilization means includes a corona discharge tube adapted to maintain a current flow therethrough in both the on and off condition of said transistor-oscillator.

4. A converter according to claim 1 wherein said base circuit includes a high resistance interposed between the base of said curent limiting transistor and said output rectifying means at a voltage higher than said operating voltage.

References Cited by the Examiner
UNITED STATES PATENTS 2,791,739   5/1957   Light _____ 321—18

FOREIGN PATENTS 1,300,422   6/1962   France.

JOHN F. COUCH, *Primary Examiner.*

W. H. BEHA, *Assistant Examiner.*